April 18, 1944.   C. J. MALHIOT   2,346,776
SEALING APPARATUS
Filed June 20, 1941   2 Sheets-Sheet 1
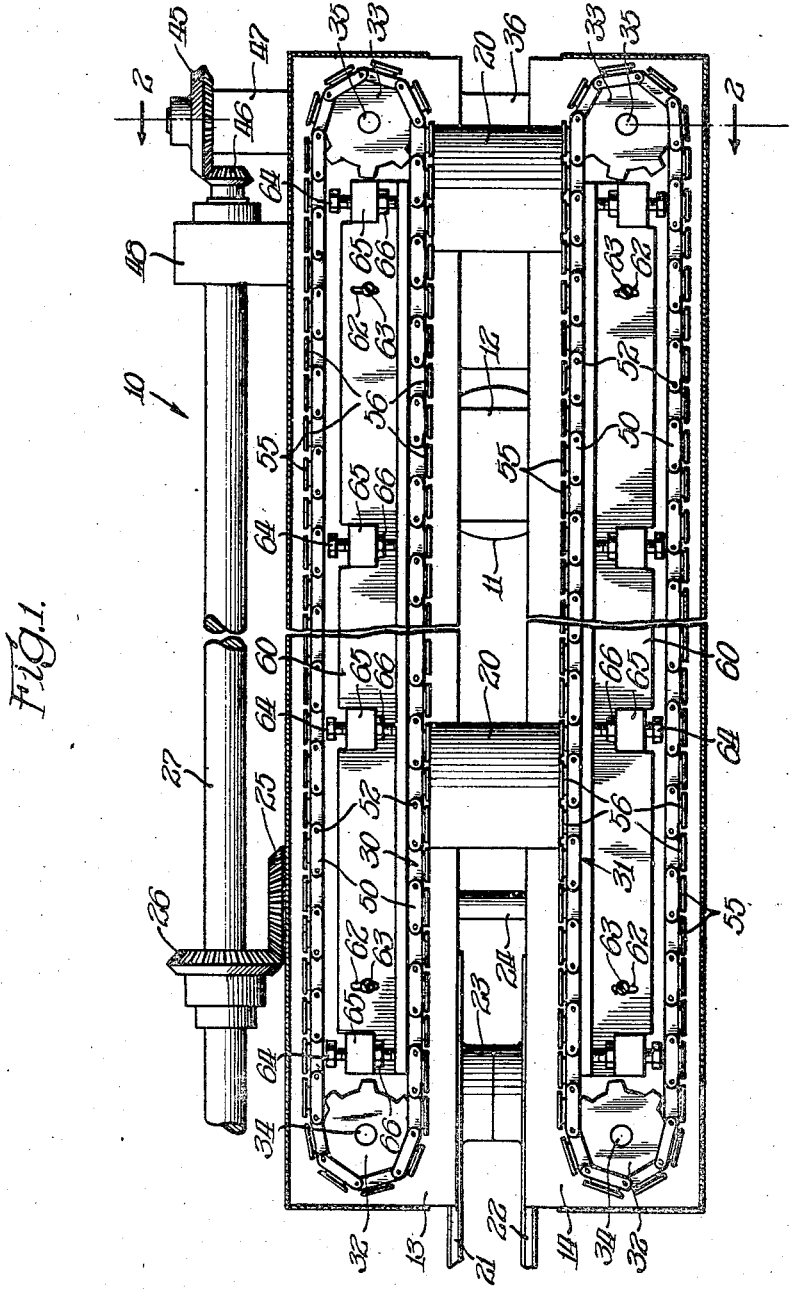
INVENTOR.
Clarence J. Malhiot
BY
Spencer, Marzall, Johnston & Cook
ATTORNEYS.

April 18, 1944.   C. J. MALHIOT   2,346,776
SEALING APPARATUS
Filed June 20, 1941   2 Sheets-Sheet 2
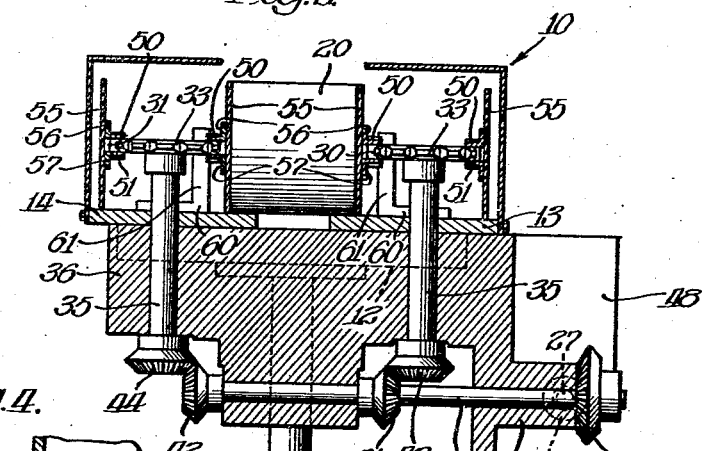
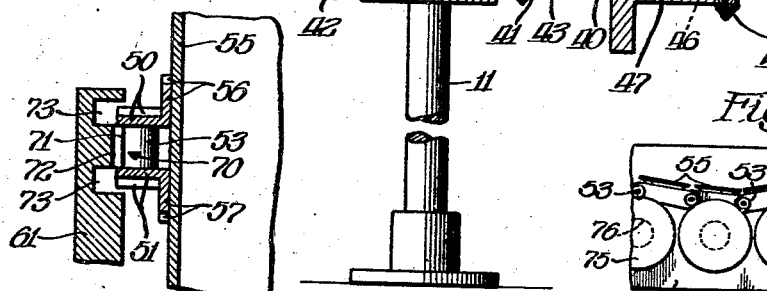
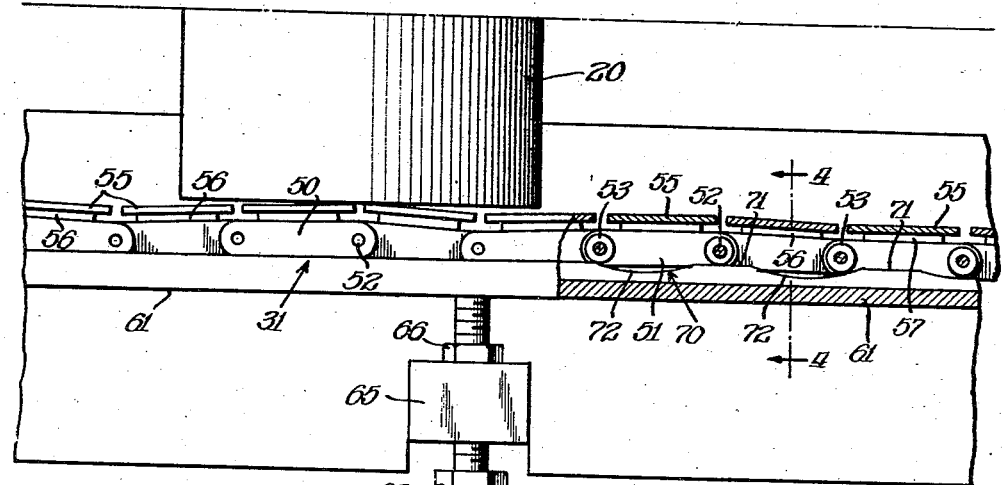
INVENTOR.
Clarence J. Malhiot
BY
Spencer, Marzall, Johnston & Cook,
ATTORNEYS.

Patented Apr. 18, 1944

2,346,776

UNITED STATES PATENT OFFICE 2,346,776

SEALING APPARATUS

Clarence J. Malhiot, Oak Park, Ill., assignor to F. B. Redington Co., Chicago, Ill., a corporation of Illinois Application June 20, 1941, Serial No. 398,990

17 Claims. (Cl. 93—6)

This invention relates to sealing apparatus and more particularly to a machine for securing together surfaces having a coating of adhesive therebetween.

A primary object of the invention is a provision of simple, inexpensive, and effective apparatus for causing positive and complete adherence of two or more contacting surfaces adapted to be adhesively secured together, and for forming a strong and smooth bond between the surfaces.

A further object is the provision of apparatus for effecting the complete, positive, and smooth adherence together of adhesively secured wrapping and sealing members such as wrappers and seals for packaging and retaining articles or the like.

A further object is the provision of a sealing apparatus for adhesively securing surfaces together in which surfaces having an adhesive coating therebetween are subjected to a substantially constantly varying pressure during drying and setting of the adhesive to properly distribute the adhesive and provide for a firm, smooth, and uniform adherence between the surfaces.

A further object is the provision of such sealing apparatus in which the varying pressure is applied to substantially the entire coated area of the surfaces, and different variable pressures are applied to different portions of the surfaces.

A further object is the provision of such sealing apparatus in which the pressure for securing adhesively contacting surfaces together is varied to apply alternately increasing and decreasing pressures to certain portions of the surfaces while applying alternately decreasing and increasing pressures to adjacent portions of the surfaces.

A still further object is a provision of sealing apparatus of the character above described which is continuous and automatic in operation, and provides for continuously receiving articles or the like having an adhesive coating between contacting surfaces thereof, applying a varying pressure to the coated surfaces for a time sufficient to effect a substantial drying and setting of the adhesive, and continuously discharging the articles or the like with the coated surfaces firmly and uniformly secured together.

Numerous other objects and advantages will be apparent throughout the progress of the following specification.

The accompanying drawings illustrate a selected embodiment of the invention and the views therein are as follows:

Fig. 1 is a top-plan view, partly in section, of the apparatus;

Fig. 2 is a transverse sectional view taken on the line 2—2 of Fig. 1;

Fig. 3 is a fragmentary top-plan view, partly in section, showing certain details of the structure of the apparatus shown in Fig. 1;

Fig. 4 is a fragmentary detail section taken on the line 4—4 of Fig. 3; and

Fig. 5 is a fragmentary detail view corresponding to a portion of Fig. 3 on a reduced scale and showing a modified construction.

The particular machine herein shown and described for illustrating the invention is for the purpose of securing a seal or like member to the folded ends of a wrapper for tubular articles, such as a roll of toilet paper or the like, to maintain the wrapper closed and in position around the article, and is particularly adapted for use with the wrapping machine disclosed in the applicant's co-pending application, Serial No. 398,987, filed concurrently herewith and assigned to the present assignee, and the feeding and applying mechanism shown in the applicant's co-pending application, Serial No. 398,988, also filed concurrently herewith and assigned to the present assignee. The invention is not limited, however, to this precise purpose or to use in conjunction with the above described machines, but is applicable, in general, for forming a strong, smooth, and uniform bond between any desired adhesively coated surfaces and more particularly to the securing of a wrapper or the like around any desired article or object.

Referring to the drawings, the apparatus is indicated generally by the reference numeral 10 and comprises a supporting pedestal 11, a supporting plate 12 carried by the pedestal, and a pair of longitudinally extending plates 13 and 14 carried by the plate 12. The plates 13 and 14 provide for supporting the wrapped roll of toilet paper or other article during its passage through the apparatus and also provide for supporting the operating mechanism of the machine.

In the illustrated embodiment, the rolls of toilet paper 20 or other articles are adapted to be fed to the sealing apparatus by a continuous rotating conveyor, and for this purpose a pair of conveyor chains 21 and 22 are shown at the feeding or left hand end of the machine as viewed in Fig. 1 and are adapted to train around and to be operated by a sprocket 23 carried by suitable bearings (not shown) on the underside of plates 13 and 14. A transverse shaft 24 is rotatably mounted on the underside of plates 13 and 14 adjacent the sprocket 23 and has an operative connection (also not shown) with the sprocket. The shaft 24 is adapted to be continuously rotated by a bevel gear 25 meshing with a bevel gear 26 carried by a longitudinally extending drive shaft 27. The drive gear shaft 27 is continuously rotated by any suitable means such as a part of the mechanism of the aforementioned concurrently filed applications.

A pair of endless conveyor chains 30 and 31 are mounted on the plates 13 and 14 and provide for receiving the articles 20 as advanced by the feeding conveyor 21—22 and moving them through the sealing apparatus. The chains 30 and 31 are individually mounted on the respective plates 13 and 14 and train around sprockets 32 and 33 mounted on shafts 34 and 35 rotatably carried by each of the plates 13 and 14. As shown in Fig. 2, a bearing block 36 is attached to the underside of the plates 13 and 14 and provides a bearing for rotatably mounting the shafts 35, the shafts 34 being similarly supported. The shafts 34 and sprockets 32, however, are merely idlers while the shafts 35 and sprockets 33 are adapted to be driven by the drive shaft 27.

For this purpose a transversely extending shaft 40 is rotatably carried by the bearing block 36 and carries bevel gears 41 and 42 which mesh with bevel gears 43 and 44 attached to the shafts 35. A bevel gear 45 is attached to one end of the shaft 40 and meshes with a bevel gear 46 connected to the drive shaft 27. Thus, as the drive shaft 27 is continuously rotated the sprockets 33 are continuously rotated and effect continuous travel of the conveyor chains 30 and 31. The block 36 has an extension 47 providing for supporting the end of the shaft 40 and a projection 48 providing a bearing for the end of shaft 27.

The conveyor chains 30 and 31 each comprise a plurality of upper and lower links 50 and 51, respectively, pivotally connected together as indicated at 52 and separated by rollers 53. The rollers 53 are adapted to be engaged by the teeth of the driving sprockets 33 to effect movement of the conveyor chains 30 and 31 and also mesh with the teeth on the idler sprockets 32 during movement of the conveyor chains.

A presser plate 55 is attached to each of the respective upper and lower links 50 and 51 by means of upwardly and downwardly extending flanges 56 and 57 provided on the links 50 and 51, respectively. The presser plates 55 are adapted to engage against opposite ends of the article 20 as it is received in the machine and to move the article through the apparatus. The presser plates 55 also provide for securing and sealing the ends of a wrapper or the like around the article 20 during its passage through the machine.

The article 20 is adapted to be delivered to the sealing apparatus 10 by means of the conveyor chains 21—22 with a wrapper properly enclosing the same and having its ends folded to be adhesively secured in closed position around the article. The adhesive for securing the folded ends in position is applied before the article is fed to the sealing apparatus, and when the apparatus is used with the machine of the above described application, Serial No. 398,988, a separate member or seal adapted to secure the folded ends in position is adhesively applied to the ends of the article 20 before being fed to the apparatus. The presser plates 55 engage against the ends of the article 20 and press the seals or other adhesively coated portions of the wrapper into firm engagement with the wrapper.

The chains 30 and 31 and the presser plates 55 which engage the opposite ends of the article 20 are supported throughout the inner reach between the sprockets 32 and 33 by means of an angle bar 60 mounted on each of the plates 13 and 14 and having an upstanding leg 61 adapted to engage and provide a guide for the rollers 53 of the conveyor chains. The angle bars 60 are adjustably mounted on the plates 13 and 14 by means of transversely extending slots 62 provided in the angle bars and bolts 63 extending through the slots 62 and threadedly engaging the plates 13 and 14. The angle bars 60 are mounted in proper adjustment on the plates 13 and 14 by means of adjusting screws 64 which are threadably received within upstanding lugs 65 provided on the plates 13 and 14. Lock nuts 66 provide for maintaining the screws 64 in adjusted position. The angle bars 60 thus provide for spacing and supporting the inner reaches of the conveyor chains and the presser bars 55 carried thereby at a proper distance apart with respect to the article 20 and at the same time are adjustable to accommodate articles of different sizes and dimensions.

To provide for forming a strong, smooth and uniform bond between the adhesively coated surfaces of the article 20 during its passage through the apparatus 10 and setting of the adhesive, the presser plates 55 are given a movement providing for varying the pressure applied to the coated areas of the articles and for alternately increasing and decreasing the pressures applied to certain portions of the coated surfaces while applying alternately decreasing and increasing pressures to adjacent portions of the surfaces. This movement of the plates 55 is accomplished by means of a cam surface 70 provided on the upstanding leg 61 of the angle bar 60. As shown in the right hand portion of Fig. 3, the cam surface 70 comprises a plurality of spaced raised portions 71 separated by depressed curved portions 72. The rollers 53 of the conveyor chains 30 and 31 ride upon the cam surface 70 and owing to their pressure against the ends of the article are caused to follow the configurations of this cam surface. Thus, as the conveyor chains 30 and 31 advance the article 20 through the apparatus 10 the rollers 53 of the chains alternately ride upon the raised portion 71 and the curved depressed portion 72 of the cam surface 70. Recesses 73 are provided in the leg 61 of angle bars 60 at opposite sides of the cam surface 70, Fig. 4, and provide for receiving the sides of links 50 and 51 while the rollers 53 ride on the cam surface.

The presser plates 55 are, accordingly, pressed against the ends of the article 20 with a substantially constantly increasing and decreasing pressure and at the same time the plates 55 are rocked to alternately increase and decrease the pressure applied to certain portions of the article 20 while simultaneously decreasing and increasing the pressure applied to adjacent portions of the article. This movement of the plate 55 is clearly indicated in the left hand portion of Fig. 3 in which the movement has been exaggerated to better illustrate the action of the plates.

Instead of a continuous cam surface 70, a plurality of spaced rollers 75 mounted on stud shafts 76 carried by the plates 13 and 14 may be provided to guide and support the inner reaches of the conveyor chains and cause the rocking movement of the plates 55 as shown in Fig. 5.

It will thus be apparent that as the article 20 progresses through the apparatus 10, the adhesively coated surfaces at the ends of the articles will be pressed against the article during setting of the adhesive by the plates 55 mounted upon the cooperating conveyor chains 30 and 31, and that the action of the plates 55 during travel of the article through the apparatus is such as to vary the pressure applied to different portions of the adhesively coated surfaces to properly distribute the adhesive and secure the surfaces firmly and uniformly together. The length of the apparatus and the relative speed with which the article 20 travels therethrough is such that the adhesive has properly set before the article is discharged from the right hand end of the apparatus as shown in Fig. 1. The article is thus discharged from the machine with the adhesively coated surfaces thereof strongly, smoothly and uniformly bonded together. The apparatus also provides for continuously receiving articles 20 from the conveyor 21—22, continuously moving the articles through the machine while securing adhesively coated contacting surfaces thereon, and for continuously discharging the properly sealed articles from the machine.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A sealing apparatus of the character described for adhesively securing surfaces together with a strong, smooth and substantially uniform bond comprising means for supporting an article or the like having contacting surfaces with adhesive therebetween, means including a pressure plate of substantial area for applying a pressure on said article or the like to press said contacting surfaces together, and means for causing said pressure plate to wobble in opposite directions a plurality of times while in contact with the article to vary said pressure during setting of the adhesive.

2. A sealing apparatus of the character described for adhesively securing surfaces together with a strong, smooth and substantially uniform bond comprising means for supporting an article or the like having contacting surfaces with adhesive therebetween, means including a plurality of pressure members of substantial area for applying pressure over substantially the entire adhesive covered area of the contacting surfaces of said article or the like, and means for causing each of said pressure members to wobble in opposite directions a plurality of times while in contact with the article to vary said pressure during setting of the adhesive.

3. A sealing apparatus of the character described for adhesively securing surfaces together with a strong, smooth and substantially uniform bond comprising means for supporting an article or the like having contacting surfaces with adhesive therebetween, means including a plurality of pressure members of substantial area for applying a pressure on said article or the like to press said contacting surfaces together, and means for imparting a wobbling motion to each of said pressure members while in contact with the article to vary said pressure during setting of the adhesive, said last named means causing adjacent pressure members to wobble in different directions to apply different variable pressures to different portions of the adhesive covered area of the contacting surfaces.

4. A sealing apparatus of the character described for adhesively securing surfaces together comprising means for supporting an article or the like having contacting surfaces with adhesive therebetween, a presser plate adapted to press against said contacting surfaces, and means for rocking said plate a plurality of times in different directions while in contact with said surfaces to vary the pressure applied by the plate.

5. A sealing apparatus of the character described for adhesively securing surfaces together comprising means for supporting an article or the like having contacting surfaces with adhesive therebetween, a plurality of presser plates adapted to engage said contacting surfaces over substantially the entire adhesive covered area thereof, and means for rocking each of said plates while in contact with said surfaces, said last named means causing adjacent plates to rock in opposite directions to apply alternately increasing and decreasing pressures to certain portions of the contacting surfaces while applying alternately decreasing and increasing pressures to other portions of said surfaces.

6. A sealing apparatus of the character described for adhesively securing surfaces together comprising means for supporting an article or the like having contacting surfaces with adhesive therebetween, a presser plate adapted to press against said contacting surfaces, means for imparting movement to said plate to move said article or the like through said apparatus, and means for rocking said plate a plurality of times in different directions during said movement to vary the pressure applied by the plate to said contacting surfaces.

7. A sealing apparatus of the character described for adhesively securing surfaces together comprising means for supporting an article or the like having contacting surfaces with adhesive therebetween, a continuously moving conveyor, a presser member carried by said conveyor and adapted to engage and press against said contacting surfaces, said conveyor and presser member providing for moving said article or the like through said apparatus, and means for rocking said presser member to impart a wobbling motion thereto during movement of the article or the like through the apparatus to vary the pressure applied by the member to said contacting surfaces.

8. A sealing apparatus of the character described for adhesively securing surfaces together comprising means for supporting an article or the like having contacting surfaces with adhesive therebetween, conveyor means for moving said article through said apparatus, a presser plate adapted to engage said contacting surfaces carried by said conveyor means, and means co-operating with the conveyor means for causing said presser plate to have a wobbling motion in different directions a plurality of times while in contact with the article to apply varying pressures on said surfaces during passage of the article or the like through the apparatus.

9. A sealing apparatus of the character described for adhesively securing surfaces together comprising means for supporting an article or the like having contacting surfaces with adhesive therebetween, a presser plate adapted to press against said contacting surfaces, means for advancing said plate to move said article or the like through said apparatus, and means including a cam track for guiding said presser plate and effecting rocking thereof during passage of said article through said apparatus.

10. A sealing apparatus of the character described for adhesively securing surfaces together comprising means for supporting an article or the like having contacting surfaces with adhesive therebetween, a presser plate adapted to press against said contacting surfaces, an endless conveyor chain for supporting said presser plate and advancing the plate to move said article or the like through said apparatus, rollers on said conveyor chain, a guide member extending along the inner reach of said conveyor chain, and a cam track on said guide member engageable by said rollers for effecting rocking movement of said presser plate during passage of the article through the apparatus.

11. A sealing apparatus of the character described for adhesively securing wrappers or the like about articles comprising means for feeding a wrapped article having overlapping portions with adhesive therebetween at opposite ends of the article, a pair of continuously moving conveyors, a plurality of presser plates carried by each of said conveyors and adapted to engage and apply pressure on said opposite ends of the article, said conveyors and presser plates providing for receiving and moving said article through said apparatus, and means for rocking said presser plates to vary the pressure applied by the plates to the ends of the article during movement of the article through the apparatus.

12. A sealing apparatus of the character described for adhesively securing surfaces together comprising means for supporting an article or the like having contacting surfaces with adhesive therebetween, a conveyor means, a plurality of presser plates carried by said conveyor means and adapted to press against said contacting surfaces, and means including a plurality of spaced rollers for guiding and supporting one reach of said conveyor and cooperating with the conveyor means to effect rocking movement of said presser plates while in contact with said surfaces.

13. Sealing apparatus of the character described comprising means for supporting an article to be sealed, a presser member adapted to engage said article to seal a portion thereof, and means for alternately rocking said presser member in opposite directions a plurality of times while continuously in engagement with said article to effect said sealing.

14. Sealing apparatus of the character described comprising a presser member adapted to engage an article to seal a portion thereof, conveyor means for moving said article and said presser member through a predetermined path, and means for substantially continuously rocking said presser member in opposite directions a plurality of times while in engagement with said article to effect said sealing.

15. Sealing apparatus of the character described comprising a pair of presser members adapted respectively to engage two opposite ends of an article to be sealed, conveyor means for moving said article and said presser members through a predetermined path, and means for substantially continuously rocking said presser members in opposite directions a plurality of times while in engagement with said article to effect sealing thereof.

16. Sealing apparatus of the character described comprising a pair of continuously moving conveyors, a presser plate carried by each of said conveyors and adapted to engage and apply pressure on opposite ends of an article to be sealed, said conveyors and presser plates providing for receiving and moving said article through said apparatus, and means for rocking said presser plates a plurality of times while in engagement with the article to vary the pressure applied by said plates to the ends of the article during movement through the apparatus.

17. Sealing apparatus of the character described comprising a conveyor means, a presser plate carried by said conveyor means and adapted to engage and apply pressure on an article to be sealed, and means including a plurality of spaced rollers for guiding and supporting one reach of said conveyor means and cooperating with the conveyor means to effect a plurality of rocking movements in different directions of said presser plate while in contact with said article.

CLARENCE J. MALHIOT.